United States Patent [19]

Toeppen

[11] Patent Number: 4,494,840
[45] Date of Patent: Jan. 22, 1985

[54] DUAL LENS IMAGE ROTATION SYSTEM

[75] Inventor: John S. Toeppen, Hartford, Wis.

[73] Assignee: Bell & Howell Company, Chicago, Ill.

[21] Appl. No.: 529,787

[22] Filed: Sep. 6, 1983

[51] Int. Cl.³ .............................................. G03B 21/22
[52] U.S. Cl. .................................................... 353/101
[58] Field of Search ..................... 353/101, 100, 27 R, 353/27 A, 25, 81, 26 R, 26 A; 350/254, 287, 286

[56] References Cited

U.S. PATENT DOCUMENTS

| | | | |
|---|---|---|---|
| 2,548,554 | 4/1951 | Nivison et al. | 353/81 X |
| 2,569,918 | 10/1951 | Berggren | 353/81 X |
| 2,865,274 | 12/1958 | Richartz | 350/254 X |
| 3,354,776 | 11/1967 | Smitzer et al. | 353/81 X |
| 4,111,149 | 9/1978 | Wells | 353/101 X |
| 4,172,657 | 10/1979 | Watanabe et al. | 353/27 R X |

OTHER PUBLICATIONS

Publication: Micron Corp., Series 700, Microfiche Reader.

Primary Examiner—Harry N. Haroian
Attorney, Agent, or Firm—Neal C. Johnson; Alan H. Haggard; Alan B. Samlan

[57] ABSTRACT

A device for rotating the projected image in a dual lens microfilm reader. Each lens has an image rotation prism positioned above it with selector means for positioning either of the projection lenses and its prism in the image projection path. Gears surround each prism and are driven simultaneously an identical amount by means of a drive gear engaging both of the surrounding prism gears. The projected image is rotated an identical amount regardless of which projection lens is disposed in the image light path.

8 Claims, 5 Drawing Figures

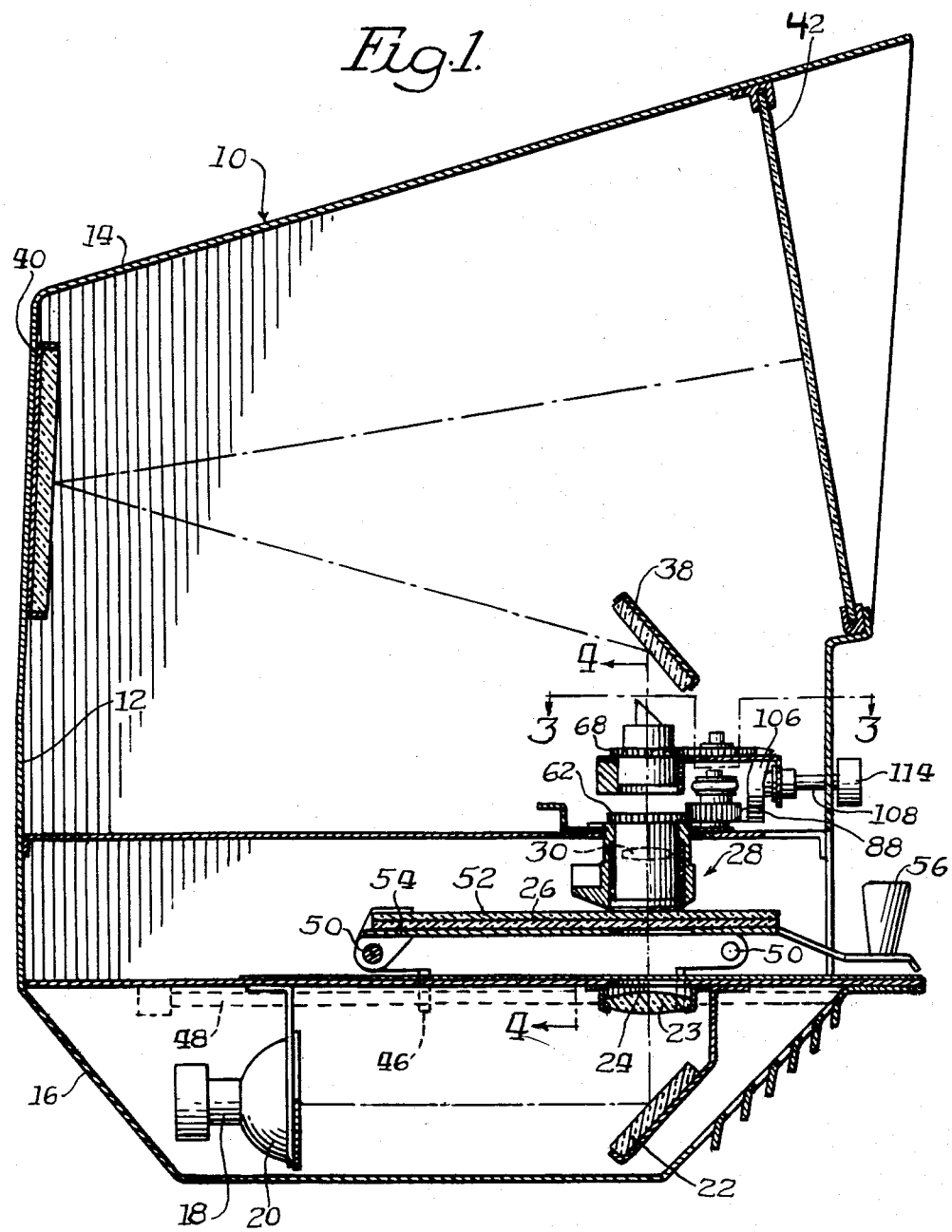

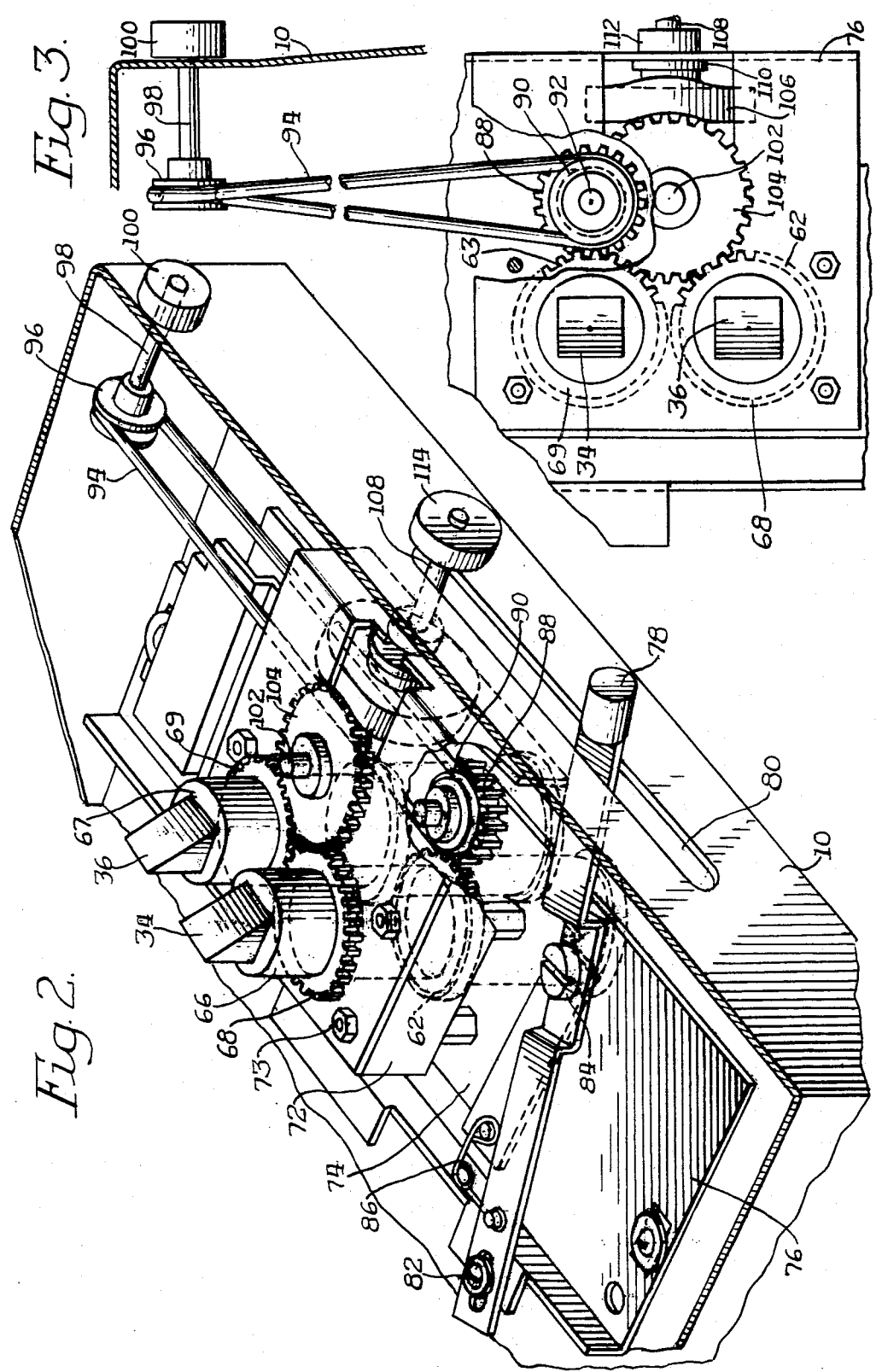

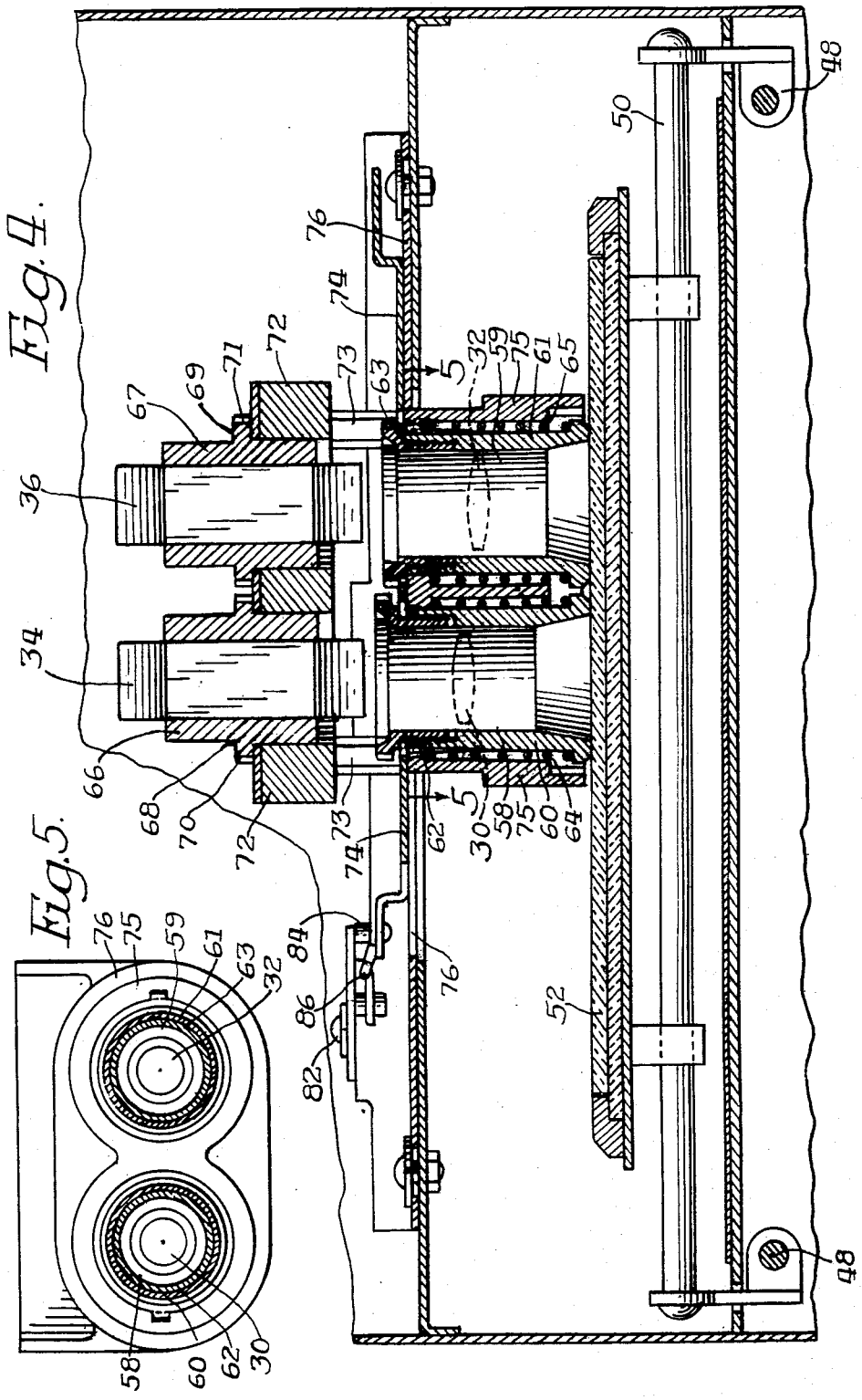

DUAL LENS IMAGE ROTATION SYSTEM

BACKGROUND AND SUMMARY OF THE INVENTION

This invention relates to microfilm readers and more particularly, microfilm readers having image rotation capability.

Microfilm has become a common media for storage and distribution of large amounts of information. Microfilm can reduce the storage area of paper documents by a hundred fold enabling large quantities of documents or graphical forms of information to be stored in a small space. The microfilm can take various storage configurations. One form is commonly referred to as microfilm jackets in which individual strips of film are placed between two transparent sheets having channels to accept and retain the film. A second form similar to microfilm jacket is microfiche, in which a piece of photoplastic material approximately four inches by six inches has the information photographed thereon. Microfiche can also be made by a duplicating process from an original microfilm jacket. The size of the microfiche can vary, however, the concept encompasses placing multiple images on a single card or fiche. Information may also be retained on rolls of microfilm which are stored in cartridges or cassettes for later retrieval.

Microfilm readers can take any one of several configurations depending on whether they are used to view flat microfilm, such as jackets or fiche, or roll microfilm which is stored in cartridges or cassettes. However, they are all similar in that they have a light projection system which concentrates a beam of light through the film, which in turn projects the image from the film onto a viewing surface. The orientation of the projected image is dependent upon the orientation of the image on the film.

Original source documents are microfilmed using any one of several types of microfilm cameras. One such type is a planetary microfilm camera in which the document is merely laid on a photographing surface which has a stationary camera mounted above or below it. A picture of the document is taken and the process is repeated for each source document. The film is developed after the documents are photographed and can either be placed in micorfilm jackets or placed in cartridges or cassettes. In another type of microfilming system, an automatic feeder sequentially feeds documents to a microfilming area and a stationary camera photographs each document. The feeder then moves the documents out of the photographing area and a new document is fed into the photographing area to be filmed. An example of such an automatic microfilm camera is illustrated in U.S. Pat. No. 4,148,579. In a last type of microfilming, a rotary microfilm recorder is used. In this type of filming apparatus, the documents are fed through a photographing area and the film is moved at the same time. Thus, while both the documents and film are actually moving, they are stationary with respect to each other. This type of microfilming is for high volume microfilming operations where a large number of documents must be microfilmed successively. An example of where such a recorder would be used is in the microfilming of checks at financial institutions.

A problem which has been encountered with planetary cameras or rotary microfilming systems is that the document is sometimes skewed when it is photographed. Thus, the image which results on the film is also at an angle with respect to the edge of the film. When the film is positioned for viewing, the images are projected at a skewed angle with respect to the horizontal. Likewise, the documents are sometimes inadvertently microflimed upside down with respect to adjacent documents giving rise to an image being projected upside down. This is an obvious nuisance to the operator who must remove, rotate and reinsert the microfilm upside down in order to view the projected image in its proper orientation. If the document is merely skewed, the operator can usually still read it although it might be awkward. In order to compensate for the various orientations of the original documents when they are photographed, it is desirable to rotate the image to orient it properly for the user when the images are projected. Generally, such image rotation is achieved by the use of a dove prism. One such example is illustrated in U.S. Pat. No. 3,649,119.

Some microfilm readers are equipped with two projection lenses which enables the projection of images in either of two magnifications, generally a low magnification and a high magnification. One example of where such a dual magnification microfilm reader is convenient is when the source document has a great deal of printed information photographed at a high magnification resulting in the printed images being relatively small when projected. The general subject matter can conveniently be found using the low magnification and when the particular information sought is to be read, the user can switch to the high magnification lens.

In prior art devices which utilize two projection lenses, image rotation devices such as the use of a dove prism, have not generally been made available. The reason is that a dove prism could only be mounted above one of the projection lenses and rotated while the other projection lens was not capable of image rotation. Thus, while one of the lenses could be rotated to present the image in its right-side-up, proper reading position, switching to the other projection lens would result in the same image now presented for viewing in its skewed or upside down position for reading. An additional problem is encountered by the use of only one prism above one lens. A prism inverts an image in a light path as a mirror does. If a prism is used only above one lens, but not both, one of the two lenses will project an inverted or "wrong reading" image when switching between the two lenses. These problems presented serious drawbacks relating to the use of image rotation devices on dual lens microfilm readers.

Applicant has attempted to solve these problems by providing a microfilm reader having dual projection lenses with prisms positioned above each of the lenses. Applicant's inventive device provides for rotating both prisms simultaneously, the same amount, which results in the amount of rotation of the projected image to be the same regardless of which projection lens is placed in the projection light path. The prism rotation is accomplished by mounting the prisms in cylindrical holders which are free to rotate above each of the projection lenses. The cylindrical holders are placed in a lens block assembly which can be moved to position either projection lens in the projection light path. A prism gear is formed around the outside diameter of the cylindrical prism holders and a drive mechanism is provided to rotate the prism holders. The drive mechanism causes the prism gears to rotate the prism holders in unison.

The drive mechanism in turn is controlled by the operator of the microfilm reader. Thus, the operator simultaneously rotates both of the prisms, in unison, a like amount. This results in the projected image being placed in the same orientation regardless of which projection lens is placed in the image projection path.

OBJECTS AND ADVANTAGES

Thus, it is an object of the invention to provide a dual lens microfilm reader having image rotation capability with each of the projection lens. A related object is to provide a dual lens microfilm reader which has both of the image rotating devices rotate a like amount such that the image is rotated the same amount regardless of which lens is placed in the image projection path.

These and other objects and advantages will become apparent upon reading the description of the drawings and detailed description of the preferred embodiment.

DESCRIPTION OF THE DRAWINGS

FIG. 1 is a side elevational view, partially in cross-section, of a microfilm reader having image rotation capability.

FIG. 2 is an enlarged perspective view with portions removed of applicant's dual lens assembly having image rotation capability on both of the dove prisms which are positioned above their respective projection lenses.

FIG. 3 is a top view with portions removed and taken along line 3—3 of FIG. 1 illustrating the focusing and prism rotation devices of applicant's invention.

FIG. 4 is a cross-sectional view taken along line 4—4 of FIG. 1 illustrating the dual lenses in relationship to their respective prisms.

FIG. 5 is a top view with portions removed of the projection lenses and take along line 5—5 of FIG. 4.

DESCRIPTION OF THE PREFERRED EMBODIMENT

Referring first to FIG. 1, a representative microfilm reader 10 herein referred to as reader 10, is illustrated. Although the reader illustrated is specifically designed for use in reading microfiche, or microfilm jackets, it should be emphasized that applicant's invention is suitable for reading other types of microflim such as roll microfilm stored in cartridges or cassettes. There is a housing 12 which is comprised of a hood 14 and a base 16. The housing 12 further encloses a projection system and a microfilm carriage as will be fully described below.

The projection system is seen to be comprised of the following elements. A lamp 18 has power supplied to it causing the lamp to be illuminated. A dichroic reflector 20 concentrates and projects the visible light forward while allowing the infra red or heat producing rays to pass through the reflector and out of the visible light beam. The light beam is reflected upward by a first mirror 22 which preferably is a dichroic mirror or "cold" mirror which allows infra read radiation to pass through the mirror and reflects only the visible light rays.

The light beam is then concentrated by a condensor lens 23 and then passes through an aperture 24. The light beam then passes through a microfilm 26 which has individual images thereon. A projection lens assembly 28 (which will be more fully described below) has at least two projection lens 30, 32, with only one of the lenses being disposed in the projection path at a time.

The image from the microfilm 26 is projected through the projection lens 30 and through one of two dove prisms 34, 36 which depends upon the dove prism disposed above its respective projection lens 30, or 32. The dove prisms 34, 36 provide for image rotation as is commonly known in the art. The image is then projected onto a second mirror 38 which then reflects it to the rear of the hood 14 against a third mirror 40. The image is then reflected to a rear projection screen 42 which is located at the front of the reader and is viewable by the operator.

The microfilm 26 is supported and retained within a microfilm carriage 44 which provides for positioning various images on the microfilm 26 in the image projection path. The microfilm carriage 44 can move front-wards and backwards by means of a pair of slides 46 which are slidably retained on rods 48 at either side of the reader 10. The carriage provides for movement from side to side by means of another pair of rods 50 which slidably retain the carriage 44 thereon. On the top of the microfilm carriage 44 are a pair of glass flats 52, 54 which retain the microfilm 26 between them. Movement of the carriage is accomplished by means of a handle 56 which is grasped by the operator and manipulated to position the desired image in the light beam path.

The projection lens assembly 28 can best be described with reference to FIG. 4. Each projection lens 30, 32 is retained within a lens barrel 58, 59 which in turn is received by cones 60, 61. A threaded insert 62, 63 is threadedly received at the tops of the cones 60, 61. The threaded inserts 62, 63 act as an screw and will move up or down with respect to the cones 60, 61 when they are rotated. The lens barrels 58, 59 rest on the top edge of the threaded inserts 62, 63 such that they will also move up or down with respect to their respective cones when the threaded inserts are rotated. Springs 64, 65 surround each of the cones 60, 61 to apply a downward force against the bottom edge of the cone which in turn keeps the cone pressed against the top glass flat 52. This provides a reference plane for the projection lenses which thus remains a constant distance from the microfilm 26 during projection of an image. It can also be seen that by rotating the threaded inserts 62, 63 the distance between the projection lenses 30, 32 with respect to the microfilm 26 can be varied, thus providing for focusing of the image. As the lens barrels 58, 59 are merely dropped into the cones 60, 61 and only held by gravity, it can also be seen that the lenses can be removed for cleaning or replacement.

The dual prism lenses are most clearly illustrated in FIG. 4. It can be seen that the dove prisms 34, 36 are mounted in prism holders 66, 67 which securely retain the prisms within them. Prism gears 68, 69 are formed integrally with their respective prism holders 66, 67. Prism gears 68, 69 each have outstanding toothed shoulders 70, 71. The pitch diameter and number of teeth on each gear is identical. The toothed shoulders 70, 71 rest on a mounting block 72 which in turn is connected by means of posts 73 to a moveable plate 74. The moveable plate 74 has a supporting structure 75 and both serve as the mounting chassis for the cones 60, 61 and maintain the projection lenses 30, 32 in alignment with their respective prisms 34, 36. It can be seen that by rotating the toothed shoulders 70, 71 the prism holders 66, 67 and their respective prisms 34, 36 will be rotated resulting in image rotation of the projected image.

The lens selection apparatus is best illustrated in FIG. 2. Within the reader 10 is a reader chassis 76 which is attached to the reader 10. Connected to the reader chassis 76 is a lens selection lever 78 which has a front end extending through a slot 80 in the front of the reader 10. The rear of the lens selection lever 78 is affixed to the reader chassis 76 by means of a fixed pivot 82. Approximately at the middle of the lens selection 78 is a pivot 84 which connects the moveable plate 74 to the lever 78. The design of the moveable plate 74 is such that it is further supported by the reader chassis 76 at its side edges (as seen in FIG. 4) to further give support to the plate 74. When the lens selection lever 78 is moved from its position shown in FIG. 2, to the left, the moveable plate 74 also moves to the left. This results in lens 32 and its associated projection devices to be positioned in the image projection path. With the lens selection lever 78 in the position shown in FIG. 2, lens 30 and its associated projection devices are positioned in the image projection path. Thus, by moving the lens selection lever 78 either of the lenses 30, 32 can be positioned for projection. A hair spring 86 is connected between the rear of the lever 78 and the moveable plate 74. This aids in pushing the moveable plate 74 into either the right or left position rather than maintaining a central, non-image projecting position.

As previously stated, the lens barrels 58, 59 must be able to be moved with respect to the microfilm 28 in order to achieve focusing. Additionally, it is desirable that each of the lens barrels 58, 59 be able to be focused individually and once that focus is set, it should remain unchanged unitl the operator desires to refocus. This is accomplished in applicant's device by the use of a focusing gear 88 (FIG. 3) which meshes with the threaded inserts, 62, 63. The focusing gear 88 will mesh with the appropriate threaded insert depending upon which of the projection lenses is disposed in the image projection path. Thus, by movement of the lens selection lever 78, the appropriate threaded insert is moved into engagement with the focusing gear 88. The focusing gear 88 is rotated by means of a focusing pulley 90. Both the focusing pulley 90 and focusing gear 88 are mounted on a common shaft 92. The focusing pulley 90 is rotated by means of a belt or "o" ring 94 which in turn is wrapped around a pulley 96. This in turn is mounted on a shaft 98 which extends through the front of the microfilm reader 10. A focusing knob 100 is mounted on the end of the shaft 98. Thus, the operator can rotate the focusing knob 100 which through the interconnecting shaft and drive system causes rotation of the focusing gear 88 and the threaded insert 62 or 63.

It can also be seen that once the threaded inserts 62, 63 are rotated and their respective lens barrel 58, 59 is raised or lowered with respect to its cone, they retain their position until the insert is again rotated. This is a desirable feature in that each of the lenses must be focused individually so that the operator does not have to refocus when switching between lenses.

Applicant's inventive prism rotation system is illustrated most clearly in FIGS. 2 and 3. Mounted on the top of the mounting block 72 is a shaft 102 having a transition gear 104 mounted thereon for rotation. The transition gear 104 simultaneously engages both prism gears 68 and 69. The initial engagement of the transition gear 104 with the prism gears 68 and 69 is important. The prisms 34 and 36 are disposed in the same orientation such that an image projected through either prism will be oriented identically regardless of which prism is placed in the image projection path. Thus, when the transition gear 104 is rotated, it causes an identical rotation in the same direction for either of the prism gears 68 or 69. This results in an equal angular displacement for the prisms 34 or 36 and their respective projected images.

Rotation of the transition gear 104 is accomplished by means of an image rotation gear 106 which is perpendicular to the gear 104. The image rotation gear can be a spur or bevel gear, or preferably can be a flexible, rubber-like wheel which frictionally engages the outer teeth of the transition gear 104. The flexibility and rubber-like construction of the image rotation gear 106 permits large manufacturing tolerances while still providing a reliable and secure means of engagement and rotation of the transition gear 104. The image rotation gear 106 is mounted on an image rotation shaft 108 which extends through the front of the microfilm reader 10. A pair of collars 110, 112 secure the shaft 108 to the mounting block 72. An image rotation knob 114 is mounted on the end of the shaft 108 and provides a knob which the operator can easily grasp and rotate to cause image rotation. Furthermore, the shaft 108 passes through the slot 80 just as did the lens selection lever 78. Thus, when the lens selection lever 78 is operated causing the mounting block to shift, the shaft 108 will also slide within the slot 80 from the right to left as seen in FIG. 2.

Thus, there has been provided a dual lens microfilm reader having image rotation on both lenses. In operation, the microfilm 26 is placed between the glass flats 52, 54. One of the projection lenses, generally the lower magnification lens, is placed into the projection path by means of the lens selection lever 78. The particular image is located by means of moving the carriage 44. If the image is not placed in its proper reading orientation, the image rotation knob 114 is turned to properly orient the projected image on the screen 42. If greater magnification is required, the lens selection lever 78 is operated to place the other projection lens, generally a higher magnification lens in the projection path. As the inventive device causes both of the prisms 34, 36 to have been rotated a like amount, the image projected on the higher magnification is still in its proper reading orientation. The focusing mechanism engages the threaded inserts 62 and 63 separately and permits individual, independent focusing of the lenses 30, 32.

Thus it is apparent that there has been provided, in accordance with the invention, a dual lens microfilm reader having image rotation that fully satisfies the objects, aims and advantages set forth above. While the invention has been described in conjunction with a specific embodiment thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What is claimed is:

1. Apparatus for rotating a projected image in an image light path comprising:
    two projection lenses mounted adjacent each other in separately adjustable threaded receiving means for individually focusing the lenses by rotating the receiving means,
    a focusing gear which engages individually the adjustable threaded receiving means, means to rotate the focusing gear, an image rotation prism disposed above each of the projection lenses, selector means to position either lens and its prism in the image light path, the selector means also positioning either threaded receiving means in engagement with the focusing gear, a prism gear surrounding each prism, a drive gear simultaneously engaging both of the prism gears, and means to rotate the drive gear to rotate the prisms in unison an identical amount to cause the amount of rotation of the projected image to be the same regardless of which projection lens is disposed in the image light path.

2. The apparatus of claim 1 and further comprising a mounting frame on which the prism gears and drive gear are mounted.

3. The apparatus of claim 2 and further comprising collar means surrounding each prism to support each prism for rotation above the projection lens.

4. The apparatus of claim 2 wherein the means to rotate the drive gear comprises a shaft operatively connected to the drive gear, the shaft being rotatable by an operator whereby the operator can rotate the shaft thereby causing rotation of the projected image.

5. In a dual projection lens microfilm reader, an image projection system having a projection lamp, a light beam projected from the projection lamp, means to direct the light beam through a micro image bearing medium, two projection lenses positioned adjacent each other with only one lens disposed in the light beam at a time, means to project the light beam and image onto a projection surface to view the image, the improvement being an image rotation and focusing device comprising:

an image rotation prism disposed above each of the projection lenses, the projection lenses mounted in separately adjustable threaded receiving means for individually focusing the lenses by rotating the threaded receiving means, a focusing gear which engages individually the adjustable threaded receiving means, means to rotate the focusing gear, focusing means to move the projection lenses relative to the image bearing medium to focus the image on the projection surface, selector means for positioning either of the projection lenses and its prism in the light beam, the selector means also positioning either threaded receiving means in engagement with the focusing gear, a prism gear surrounding each prism, a drive gear simultaneously engaging both of the prism gears, and means to rotate the drive gear to rotate the prisms in unison an identical amount to cause the amount of rotation of the projected image to be the same regardless of which projection lens is disposed in the light beam.

6. The image rotation device of claim 5 and further comprising a mounting frame on which the prism gears and drive gear are mounted.

7. The image rotation device of claim 6 and further comprising collar means surrounding each prism to support each prism for rotation above the projection lens.

8. The image rotation device of claim 5 wherein the means to rotate the drive gear comprises a shaft operatively coupled to the drive gear, the shaft extending from the microfilm reader whereby a user of the reader can rotate the shaft thereby causing rotation of the projected image.

* * * * *